United States Patent

Miekis

Patent Number: 5,832,164
Date of Patent: Nov. 3, 1998

[54] SUPPORTING STRUCTURE FOR A PRISM LIGHT GUIDE

[76] Inventor: Kevin D. Miekis, 1509 Buckeye St., Genoa, Ohio 43430

[21] Appl. No.: 861,681

[22] Filed: May 22, 1997

Related U.S. Application Data

[60] Provisional application No. 60/018,271, May 24, 1996.
[51] Int. Cl.⁶ ....................................................... F21S 3/02
[52] U.S. Cl. .............................. 385/136; 248/58; 362/32; 362/147; 362/222; 385/133
[58] Field of Search ..................................... 385/133, 137; 248/58–64; 138/107; 362/32, 147–150, 217, 221–225

[56] References Cited

U.S. PATENT DOCUMENTS

| | | |
|---|---|---|
| 2,013,724 | 9/1935 | Brady ........................................ 138/107 |
| 3,478,667 | 11/1969 | Bourquin ................................. 138/107 |
| 4,105,293 | 8/1978 | Aizenberg et al. . |
| 4,787,708 | 11/1988 | Whitehead . |
| 4,834,495 | 5/1989 | Whitehead et al. . |
| 4,883,341 | 11/1989 | Whitehead . |
| 4,912,605 | 3/1990 | Whitehead . |
| 4,937,716 | 6/1990 | Whitehead . |
| 5,186,530 | 2/1993 | Whitehead . |
| 5,243,506 | 9/1993 | Whitehead . |
| 5,339,382 | 8/1994 | Whitehead . |
| 5,428,518 | 6/1995 | Huang . |
| 5,475,785 | 12/1995 | Johanson . |
| 5,613,759 | 3/1997 | Ludwig et al. ......................... 362/149 |
| 5,680,496 | 10/1997 | Burkitt, III et al. .................... 385/100 |

OTHER PUBLICATIONS

3M SCOTCH™ Optical Lighting Film Application Bulletin 75–0299–6018–6, Nov. 1988 International Lighting Review, Apr. 1993.

Primary Examiner—John D. Lee
Attorney, Agent, or Firm—MacMillan, Sobanski & Todd, LLC

[57] ABSTRACT

A light guide supporting structure has a base portion which is slidingly received and retained by a supporting member. The longitudinal edges of a light guide are secured within longitudinal slots formed in the base member. The supporting member is mounted upon a surface. The support structure includes an axial cavity which can form an electrical conduit.

11 Claims, 11 Drawing Sheets

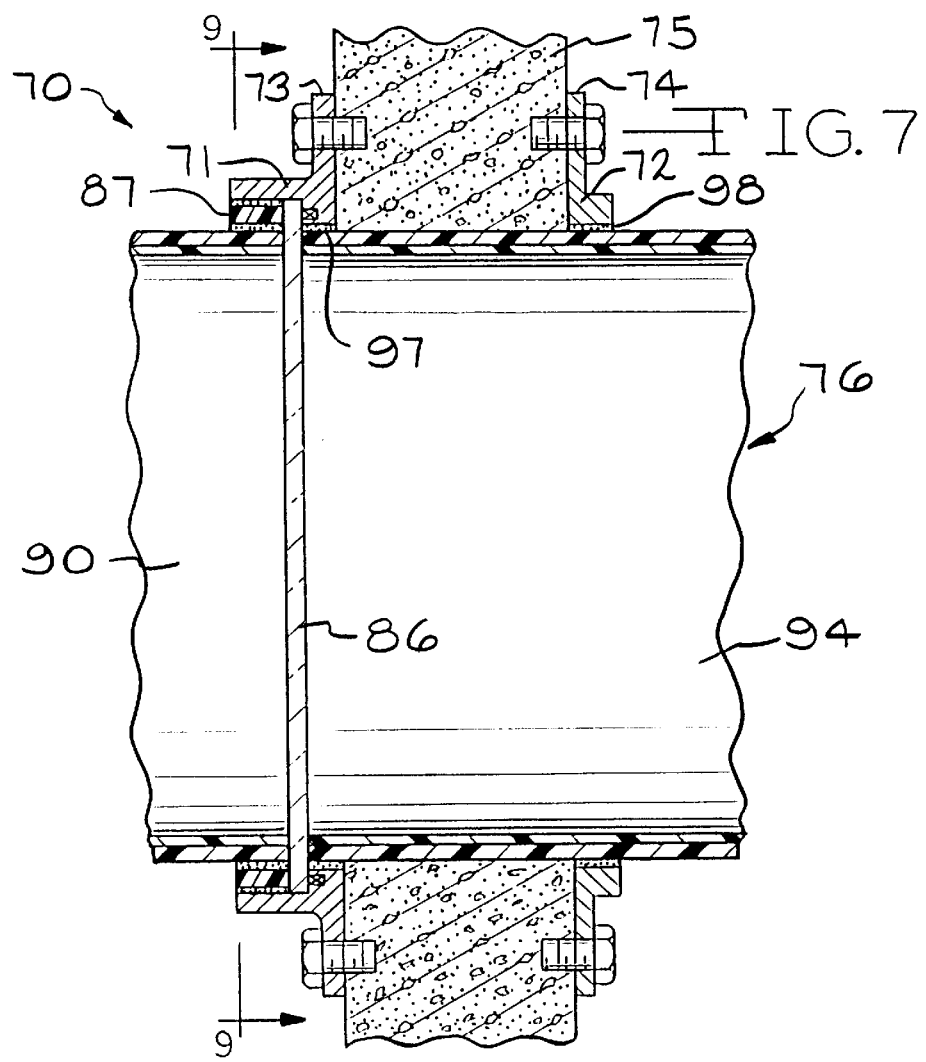
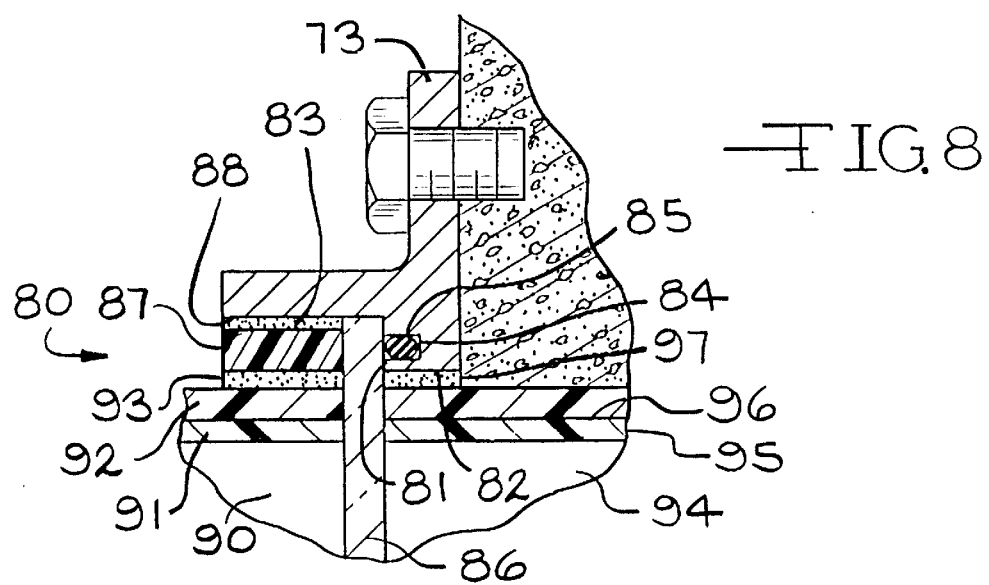

SUPPORTING STRUCTURE FOR A PRISM LIGHT GUIDE

CROSS REFERENCE TO RELATED APPLICATIONS

This application claims the benefit of U.S. Provisional application Ser. No. 60/018,271, filed May 24, 1996.

BACKGROUND OF THE INVENTION

This invention relates in general to prism light guides and in particular to an improved light guide support structure.

Light guides are devices which transmit light from one location to another by the phenomenon of total internal reflectance. It is known in the art to fabricate light guides from optical lighting film. Optical lighting film is a thin plastic film having a very high reflectance of approximately 98 percent. The film, which is formed from clear acrylic or polycarbonate, has a prism structure on one side and mirror-like smooth surface on the other side. The geometry of the prisms defines an acceptance angular range for the optical lighting film. The optical lighting film functions as a mirror for light rays incident upon the film at angles which are within the acceptance angular range for the film and as a transparent film for light rays incident at angles outside of the acceptance angular range. The film can be rolled into a cylinder with the prisms parallel to the axis of the cylinder to form a light guide. Such cylindrical light guides are commonly referred to as a light tubes. Light guides are also known to have square, semi-circular or elliptical cross sections.

An optical lighting film is commercially available from the 3M Company under the Scotch™ brand name and comprises a transparent plastic film which is approximately 0.020 inches (0.508 mm) thick. Because the optical lighting film is relatively thin, the film is typically enclosed within an outer shell for protection. The outer shell is usually formed from a clear plastic which is approximately 0.060 inches (1.524 mm) thick.

Typically, a light source, such as a near point source halogen, discharge or sulfur lamp placed in front of a sharply-focusing reflector, is attached to one end of a light guide. The focusing reflector is selected to direct light rays into the tube which have incident angles within the acceptance angular range. Thus, any light supplied by the source which is incident upon the light guide is reflected twice at the prismatic surface and returned to the original angle of incidence. As a result, the light guide will very efficiently transmit the light from the source at one end along the length of the guide to the opposite end. A plurality of light guides can be connected end to end to transmit light over long distances.

A light guide can be converted from a light transmission device to a linear luminaire by inclusion of a light scattering film within the guide. The scattering film is a white diffusing film with a high reflectance. The scattering film scatters some of the light within the guide to strike the optical lighting film at an angle of incidence which is outside the acceptance angular range. For these angles of incidence, the optical light film is transparent and the light passes through the light guide in all directions. The width of the scattering film increases with distance from the light source to compensate for the decrease in the amount of light available for extraction purposes. A focusing reflector is provided at the far end of the light guide to reflect any light which reaches the far end back into the guide.

Various supporting structures are known for light guides. Such structures must accommodate the longitudinal expansion of the optical lighting film caused by heat generated by the light source or by ambient temperature variations. The latter is especially of concern when light guides are installed out-of-doors. One common supporting structure includes a plurality of clamps spaced equally along the length of the light tube. Each of the clamps encircles the outer shell. The optical lighting film is free to expand longitudinally within the outer shell. The clamps are attached to an inverted U-channel which carries the weight of the light guide and provides longitudinal rigidity to the outer shell and the optical lighting film. The U-channel can be attached directly to a surface, such as the ceiling of a room, or suspended from the surface by a plurality of hangers.

SUMMARY

This invention relates to an improved light guide support structure.

As explained above, prior art structures for supporting light tubes tend to be complex due to the need to accommodate thermal expansion of the light guides. Accordingly, there is a need for a simpler light guide supporting structure.

The present invention contemplates a structure for supporting a light guide comprising an elongated member having a base portion and a suspension portion. The base portion is adapted to retain the longitudinal edges of a light guide and the suspension portion is adapted to be mounted upon a surface. The elongated member includes an axial cavity formed therein. The cavity defines a first end and a second end opposite from the first end. The cavity can be formed in the suspension portion of the elongated member. Alternately, the axial cavity can be formed in the base portion of the elongated member.

The base portion can be separate from the suspension portion, with the base portion being slidingly connected to the suspension portion, and with the axial cavity formed in the base portion. The base portion can have an axial rib formed thereon and the suspension portion can have an axial channel formed therein with the rib slidingly received in the channel. In the preferred embodiment, the cavity defines an electrical conduit.

Various objects and advantages of this invention will become apparent to those skilled in the art from the following detailed description of the preferred embodiment, when read in light of the accompanying drawings.

BRIEF DESCRIPTION OF THE DRAWINGS

FIG. 7 is a sectional view of a structure for supporting a light tube passing through a wall in accordance with the invention.

FIG. 8 is an enlarged portion of FIG. 7.

DETAILED DESCRIPTION OF THE PREFERRED EMBODIMENT

Figure 1:
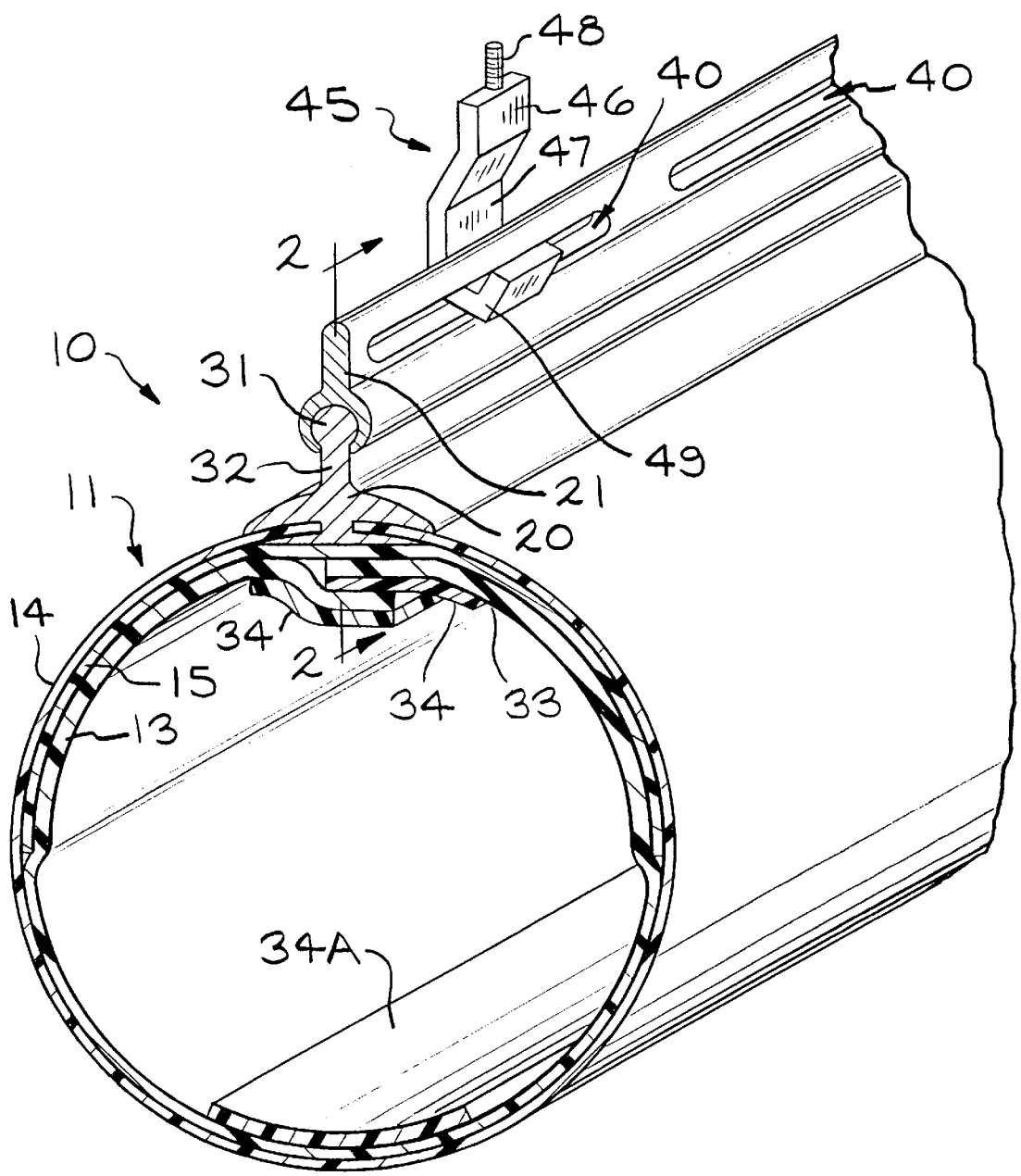
FIG. 1 is a perspective sectional view of a light guide mounted upon a supporting structure which is formed in accordance with the invention.
Figure 2A:
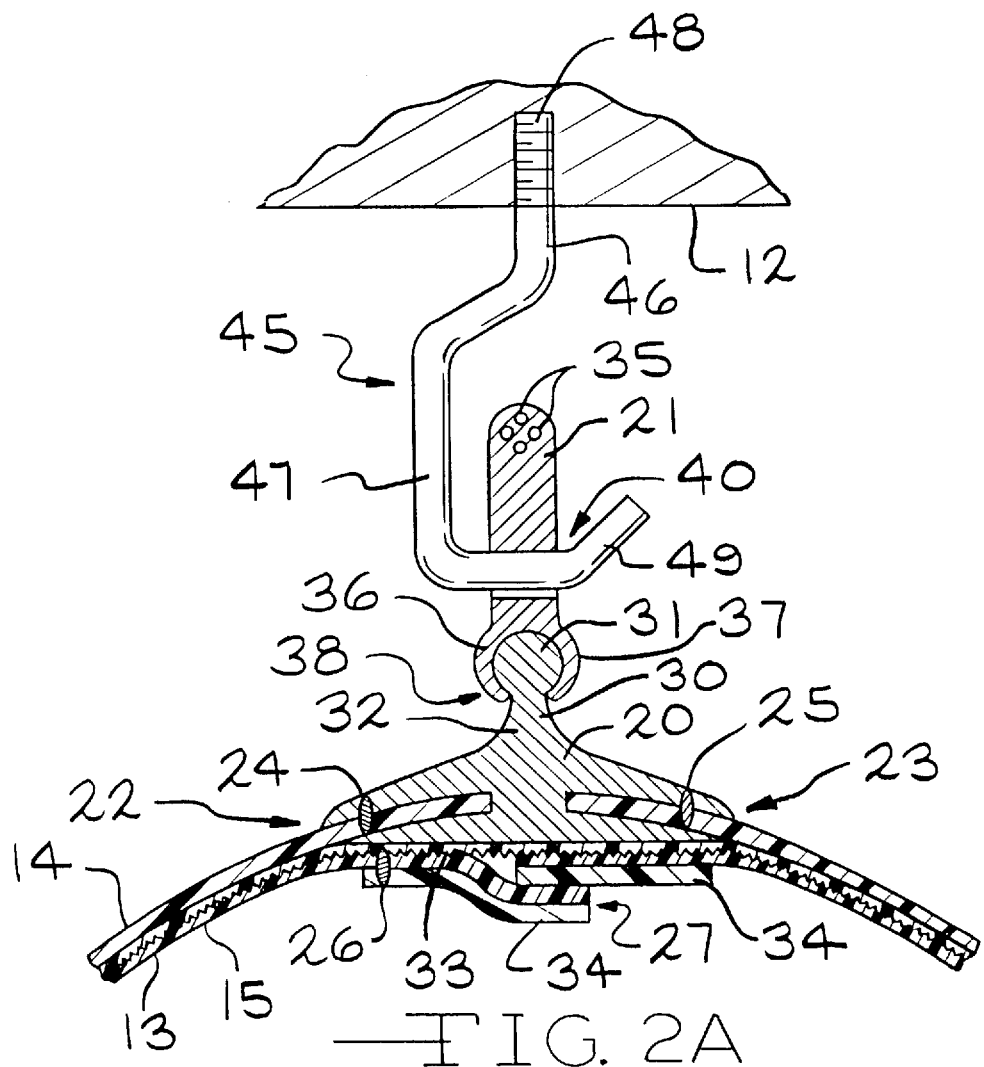
FIG. 2A is a fragmentary sectional view of the supporting structure shown in FIG. 1 taken along line 2—2.

Referring now to the drawings, there is illustrated in FIGS. 1 and 2A an improved structure 10 for supporting a light guide. The structure 10 is illustrated as suspending a cylindrical light guide 11, which is referred to as a light tube in the following description, from a horizontal surface 12, such as a ceiling of a room. While the preferred embodiment is described and illustrated with a cylindrical light tube, it will be appreciated that the invention also can be practiced with light guides having other transverse sections.

Figure 2B:
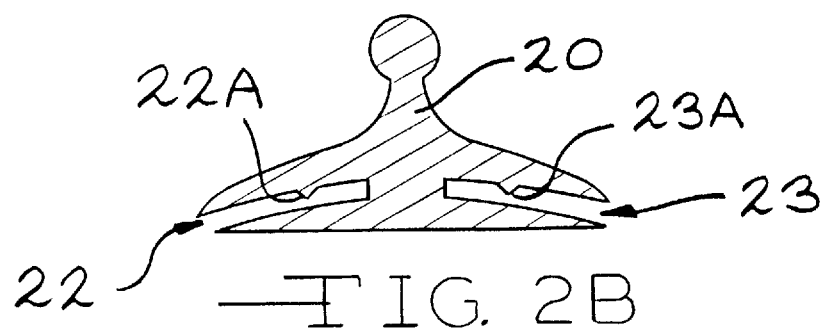
FIG. 2B is an enlarged view of a portion of FIG. 2A.
Figure 3:
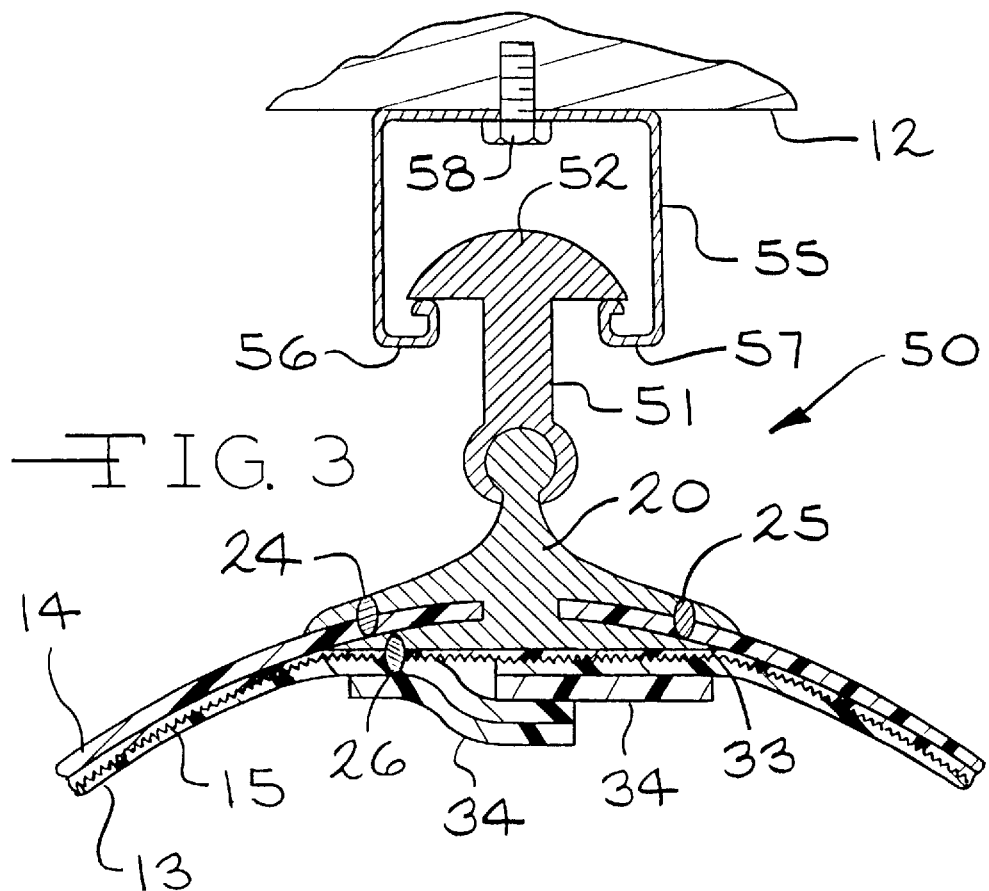
FIG. 3 is a fragmentary sectional view of an alternate embodiment of the supporting structure shown in FIG. 1
Figure 4:
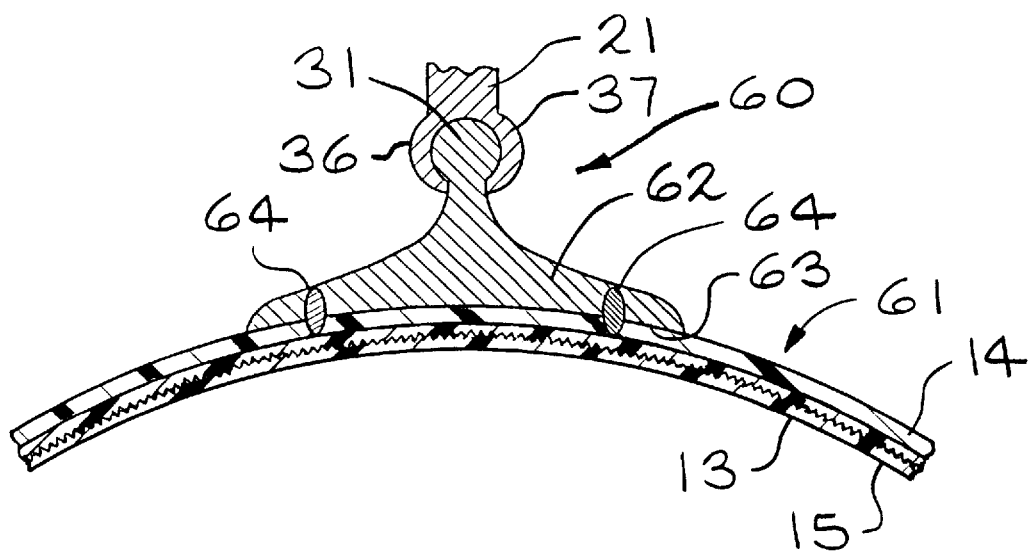
FIG. 4 is a fragmentary sectional view of another alternate embodiment of the supporting structure shown in FIG. 1

The light tube 11 consists of a cylinder having a sheet of optical lighting film 13 enclosed within an outer shell 14 formed from a clear material, such as a polycarbonate plastic or glass. The optical lighting film 13 is commercially available from the 3M Company under the Scotch™ brand name and comprises a transparent plastic film which is approximately 0.020 inches (0.508 mm) thick while the outer shell is typically 0.060 inches thick (1.524 mm). The outer shell 14 forms a protective enclosure for the optical lighting film 13. As best seen in FIGS. 2 through 4, the film 13 has an outer surface formed as adjacent longitudinal prisms and a smooth inner surface. The prismatic surface of the optical lighting film 13 is operative to transmit light within the film or a light guide formed from the film. Additionally, as will be explained below, longitudinal strips of a light reflector film 15 are sandwiched between the film 13 and the upper portion of the shell 14.

As best seen in FIG. 2A, the light guide support structure 10 consists of a generally horizontal base member 20 which is slidably attached to a generally vertical supporting member 21. The base member 20 is extruded from a plastic, such as a polycarbonate, which has the same coefficient of expansion as the material forming the outer shell 14 and the optical lighting film 13. A pair of opposed longitudinal slots 22 and 23 are formed in the sides of the base member 20. The slots 22 and 23 extend for the entire length of the base member 20. The slots 22 and 23 have an arcuate transverse shape which conforms with the radius of the cylindrical light tube 11. Additionally, the portion of the base member 20 directly under each of the slots 22 and 23 is tapered toward the base member sides. As shown in FIG. 2B, an axial ridge 22A and 23A is formed within each of the slots, 22 and 23, respectively. The ridges 22A and 23A concentrate the energy during ultrasonic welding of the outer shell 14 to enhance the welding process. It will be appreciated that the ridges 22A and 23A are optional and can be omitted if ultrasonic welding is not used.

Each of the slots 22 and 23 receives an edge of the outer shell 14. The outer shell edges are secured in the slots 22 and 23 to form the light tube 11. In the preferred embodiment, ultrasonic welds 24 and 25 are formed to attach the shell 14 to the base member 20. However, other methods may be used to secure the film edges. For example, the shell 14 can be bonded to the base member 20 with a commercially available adhesive, such as RTV Silicon. The welds 24 and 25 or adhesive form a hermetic seal between the base member 20 and the light tube 11 to protect the optical light film from contaminates such as, for example, air borne dust particles. It will be appreciated that the shape of base member 20 and the slots 22 and 23 can be modified to accommodate light guides having different transverse sectional shapes.

As best seen in FIG. 2A, the longitudinal edges of the optical lighting film 13 extend past the longitudinal edges of the outer shell 14. Additionally, the longitudinal edges of the optical lighting film 13 are separated from the outer shell 14 and extend across the bottom surface of the base member 20. One edge of the optical lighting film 13 is attached to the bottom of the base member 20 with a plurality of spot welds 26, one of which is shown. The welds 26 are formed in a longitudinal line and are offset from the edge of the optical lighting film 13 to form a pocket 27 between the base member 20 and the film 13. The opposite edge of the optical lighting film 13 is received and retained in the pocket 27. The resiliency of the optical lighting film 13 urges the film 13 against the bottom surface of the base member 20.

Because the coefficient of expansion of the material forming the base member 20 is the same as the coefficient of expansion of the material forming the outer shell 14, the outer shell 14 and the base member 20 expand together in the longitudinal direction when heated by operation of the light tube 11 or when exposed to ambient temperature variations. Similarly, the outer shell 14 and base member 20 contract together when cooled. Thus, the outer shell 14 remains secured to the base member 20 and the hermetic seal formed therebetween is maintained under all temperature variations.

A longitudinal rib 30 extends in an upward direction from the center of the upper surface of the base member 20. The rib 30 includes an upper portion 31 having a circular transverse section and is connected by a neck 32 to the base member 20. The purpose for the rib 30 will be explained below.

The light tube 11 illustrated in FIGS. 1 and 2 is intended to function as a luminary. Accordingly, a layer 33 of light reflector film covers the bottom of the base member 20 and cooperates with the strips of light reflector film 15 sandwiched between the optical lighting film 13 and outer shell 14 to form a light extractor. The reflector film cooperates with the optical lighting film 13 to retain the light within the light tube 11. While the reflector film 15 and 33 is shown extending around about 180 degrees of the circumference of the light tube 11, it will be appreciated that the reflector can cover a greater or lessor portion of the interior of the light tube 11 as required by the particular lighting requirements.

A pair of strips of scattering film 34 extends axially along the inside of top of the light tube 11. The scattering film 34 is highly reflective film which scatters some of the light within the light tube 11 to strike the optical lighting film 13 at an angle of incidence which is outside the acceptance angular range. Thus, the scattering film 34 reflects the light through the optical lighting film 13 and outer shell 14 and into the surrounding environment.

A light extractor film 34A, which can be a second prismatic film, such as, for example, 3M Series V-4114 Scotch™ film, is disposed in the bottom of the light tube 11. The light extractor film 34A redirects incident light from the scattering film 34 in a downward direction through the light tube 11 without loss of collimation. The positioning of the light extractor film 34A as shown is optional, since it may be desirable to locate the light extractor in a different portion of the light tube 11. If the light tube is solely intended to transfer light to another location, the light scattering and extractor films 34 and 34A are omitted.

The supporting member 21 is a longitudinal beam extruded from a rigid plastic, such as vinyl, or formed from a metal, such as aluminum, stainless steel or a steel alloy. The upper portion of the member 21 can include reinforcing fibers 35, such as Kelvar™, to enhance the rigidity of the member 21; however, such fibers 35 are optional. A pair of arcuate shaped longitudinal ribs 36 and 37 extend downward from the bottom of the supporting member 21. As best seen in FIG. 2, the ribs 36 and 37 define a longitudinal slot 38 having a transverse section which corresponds to the shape of the base member rib 30. The base member rib 30 is received by and frictionally retained within the slot 38 and cooperates therewith to form a sliding coupling between the base member 20 and the supporting member 21. Because the coefficient of expansion of the base member 20 may be different from the coefficient of expansion of the supporting member 21, the sliding coupling allows each of the structure members 20 and 21 to expand and contract independently when subjected to temperature variations.

As illustrated in FIG. 1, a plurality of longitudinal slots 40 are formed through the center portion of the supporting member 21. The slots 40 are spaced along the entire length of the supporting member 21. The function of the slots 40 will be explained below.

The assembled light tube 11 and support structure 10 are suspended from the horizontal surface 12 with a plurality of hangers 45 (one shown). The hangers 45 include a vertical leg 46 extending upward from a generally C-shaped portion 47. A threaded stud 48 extends in an upward direction from the top surface of the vertical leg 46. The stud 48 is screwed into the surface 12. It may be necessary to secure the stud 48 to the surface 12 with an anchor (not shown). The C-shaped portion 47 includes a horizontal leg 49. The support member slots 40 slidingly receive the C-shaped portion of the hangers 45 and are suspended from the horizontal legs 49.

The end of the light tube 11 attached to the source of illumination can be fixed, while the other end of the light tube 11 is free to move as the outer shell 14 thermally expands during temperature variations. Alternately, both ends of the light tube 11 can be free to move. Thus, the hangers 45 suspend the light tube 11 and supporting structure 10 from the surface 12 while the support member slots 40 allow longitudinal thermal expansion of the light tube 11 and supporting structure 10. Furthermore, the supporting member 21 functions as a beam to provide longitudinal rigidity to prevent the light tube 11 from sagging when heated or subjected to ambient temperature changes. The supporting member 21 also precludes any sagging of the light tube 11 which might develop with aging.

While the preferred embodiment of the invention has been described above as having separate base and supporting members 20 and 21, it will be appreciated that the invention also can be practiced with single integrally formed member (not shown) having an inverted T-shape. Additionally, other types of hangers can be used to suspend the light tube 11 and supporting structure 10. For example, an L-shaped stainless steel rod having vertical and horizontal legs (not shown) could be used as a hanger. The ends of the rod would be threaded with the end of the vertical leg being screwed into the ceiling surface. The horizontal leg of the hanger would be slidingly received by the slots 40 in the supporting member 21. A pair of vibration proof nuts (not shown) having integral washers would be threaded onto the horizontal leg on both sides of the supporting member 21 to retain the supporting member 21 thereon. A bushing (not shown) would be included on the horizontal leg of the hanger between the nuts to provide a bearing surface for the supporting member 21 and to function as a spacer for the retaining nuts. Also, it will be appreciated that a horizontal hanger (not shown) can be used to suspend the light tube 11 and supporting structure 10 adjacent to a vertical surface, such as a wall. Additionally, the light tube supporting structure 10 can hang from a threaded eyebolt (not shown). The eyebolt would be screwed into the horizontal or vertical surface and the supporting member clamped or secured with a threaded fastener to the eye portion of the eyebolt. The invention also contemplates hanging the light tube supporting structure 10 from a plurality of chains which are secured to the horizontal surface.

An alternate embodiment of the suspension structure is illustrated generally at 50 in FIG. 3. Components in FIG. 3 which are identical to components shown in FIG. 2A are identified with the same numerical designator. The alternate embodiment 50 contemplates an alternate structure for suspending the light tube 11 from the horizontal surface 12. The suspension structure 50 includes a supporting member 51 which has an upper portion 52 formed with a semi-circular transverse section. The upper portion 52 of the supporting member 51 is received through the open side of a length of U-channel 55. The U-channel 55 is a commercially available product known as "unistrut". The U-channel 55 has a pair of inwardly facing legs 56 and 57 which retain the upper portion 52 of the supporting member 51 within the channel. The edges of the legs 56 and 57 are turned upward and slidingly carry the supporting member 51. This reduces the contact area between the U-channel 55 and the supporting member 51 to reduce the friction therebetween and enhance the movement of the supporting member 51 relative to the channel 55. The U-channel 55 is attached to the surface 12 with a plurality of fasteners 58. While a threaded fastener 58 is shown in FIG. 3, other types of fasteners, such as nails, wood screws, or rivets can be used.

While the upper portion 52 of the supporting member 51 has been illustrated as having a semi-circular transverse section, it will be appreciated that other shapes are possible. For example, a generally horizontal rectangular transverse section also could be used, which would result in the supporting member having a T-shaped transverse section. Additionally, the invention can be practiced with a single integrally formed member, which would be similar to an I-beam with the lower flange carrying the light tube 11 and the upper flange received by the C-channel.

Another alternate embodiment of the supporting structure is illustrated generally at 60 in FIG. 4. Components in FIG. 4 which are identical to components shown in FIG. 2 are identified with the same numerical designator. The supporting structure 60 is intended for use with an extruded cylindrical light tube 61 which is preformed having a circular transverse section and the outer shell edges joined with a hermetic seal, such as an ultrasonic butt weld or with a silicon adhesive. The structure 60 includes a base member 62 having an arcuate bottom surface 63 which has a radius corresponding to the outside radius of the light tube 61. In the preferred embodiment, the light tube 61 is secured to the bottom surface 63 of the base member with ultrasonic welds 64. Alternately, the light tube 61 can be bonded to the base member 60 with a silicon adhesive.

It is noted that the light tube 61 illustrated in FIG. 4 does not include a light scattering film or a light extractor. Thus, the light tube 61 is intended to transmit light. It will be appreciated that the invention also can be practiced with a light scattering film and a light extractor included in the light tube 61 to form a luminaire.

Figure 5:
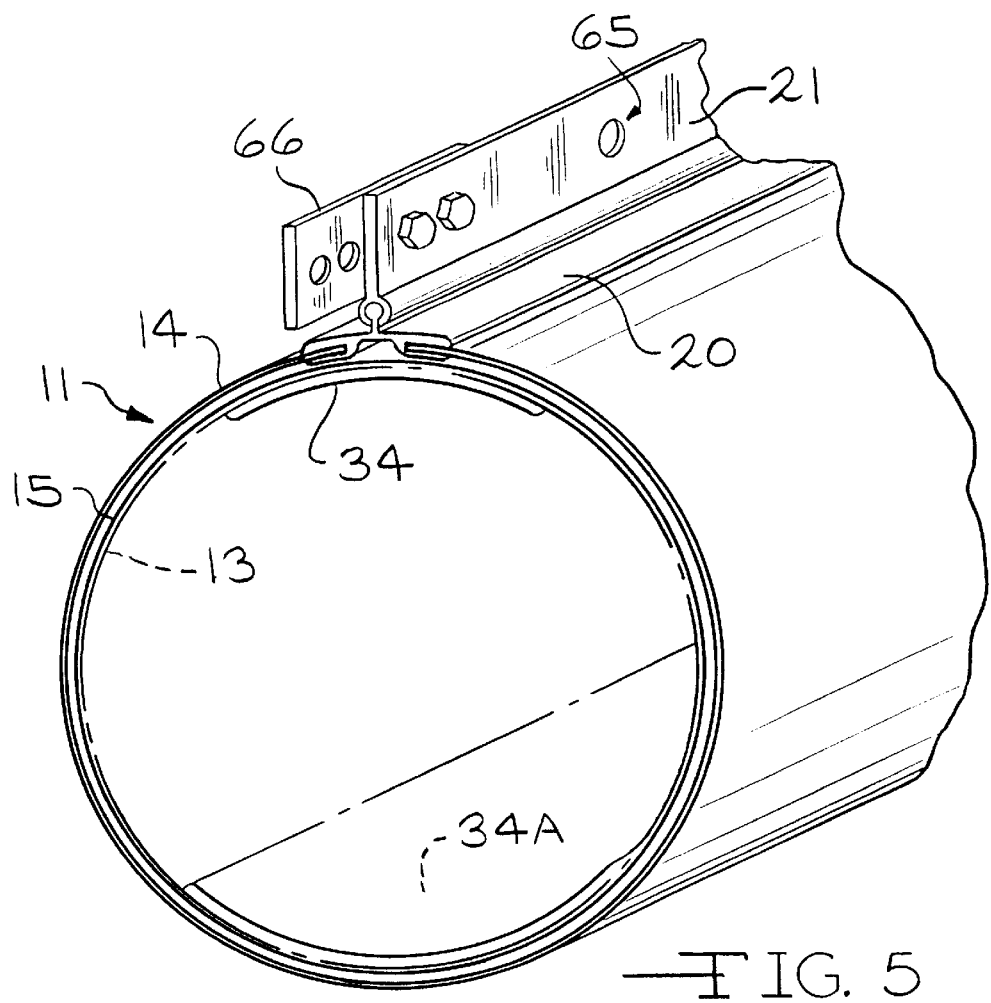
FIG. 5 is a perspective sectional view of another embodiment of a light guide mounted upon a supporting structure which is formed in accordance with the invention.
Figure 6:
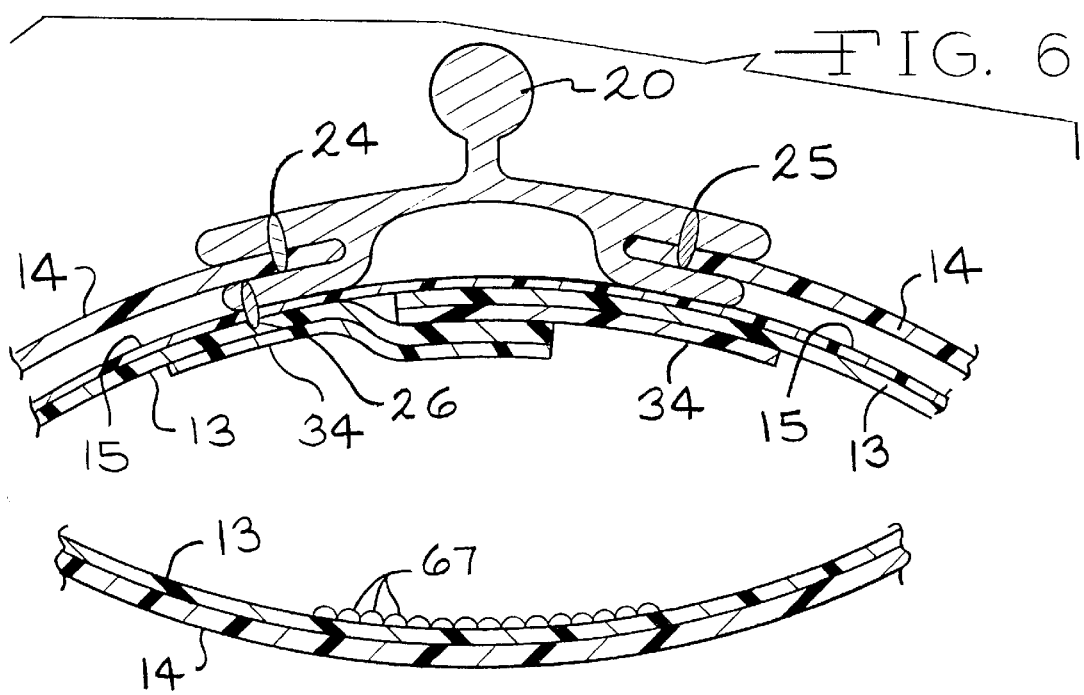
FIG. 6 is a fragmentary sectional view of the supporting structure shown in FIG. 5 taken along line 6—6.

The present invention further contemplates another embodiment of the supporting structure and light tube which is illustrated in FIGS. 5 and 6. The components shown in FIGS. 5 and 6 which are the same as similar components shown in the preceding figures are identified by the same numerical designators. The embodiment shown in FIGS. 5 and 6 contemplates that a plurality of apertures 65 are formed through the supporting member 21. The apertures receive conventional hanger hardware (not shown) for mounting the supporting structure upon a surface. In the preferred embodiment, two of the apertures 65 are formed at each end of the supporting member 65 and receive fasteners for attaching a connector plate 66 to the supporting member. The connector plate 66 joins the supporting member 65 to an adjacent supporting member (not shown) while the use of fasteners allow easy disassembly of the light tubes. Alternately, the connector plate 66 can be attached to the supporting member 65 with an ultrasonic weld or adhesive.

The light tube 11 shown in FIGS. 5 and 6 includes, as described above, an optical lighting film 13 enclosed within a clear outer shell 14. (For simplicity, some of the layers within the light tube 11 are shown with broken lines in FIGS. 5 and 6.) The longitudinal edges of the outer shell 14 are retained by ultrasonically formed welds within slots 22 and 23 formed in a base member 20. As best seen in FIG. 6, the base member 20 is shaped to facilitate formation by extrusion. As described above and illustrated in FIG. 2B, the present invention contemplates forming an axial ridge (not shown) within each of the slots 22 and 23. The ridge concentrates the energy during ultrasonic welding to enhance the welding process.

While a film is shown in FIGS. 5 and 6 for the extractor 15, the present invention further contemplates forming the reflector 15 with an ultra-violet curable ink which is cured by a process which exposes the ink to ultra-violet light. Thus, the reflector 15 would be printed upon the inner surface of each of the longitudinal edges of the outer shell 14. When the reflector 15 is printed upon the outer shell 14, the portion extending across the base member 20 can be printed directly upon the base member (not shown). Alternately, the base member 20 can be extruded from a white plastic.

Similarly, it is contemplated that the scattering layer 34 would comprise another layer of an ultra-violet curable ink which would be printed upon the inner surface of the optical lighting film 13. Thus, the fabrication of the light tube 11 can be simplified by spraying or printing the reflector and scattering layers 15 and 34 upon the outer shell 14 and optical film 13 before assembling the light tube 11. When the light tube 11 is rolled, the layers 15 and 34 are positioned within the light tube 11 to deflect light through the optical film 13 Alternately, the reflector 15 and scattering layer can be formed from a layer of Mylar film.

The invention also contemplates a light extractor formed from a plurality of droplets 67 on the inside surface of the bottom of the light tube 11. The individual droplets 67 refract incident light through the optical film 13 and the outer shell 14. In the preferred embodiment, the droplets 67 are printed with an ultra-violet curable polymer; however, other conventional ultra-violet curable materials also can be used. For example, the droplets 67 can be formed from an epoxy having an optical grade of clarity or from a mixture of a photoinitiator and a monomer or oligomer.

In the preferred embodiment, the each of the droplets 67 is formed as a paraboloid of revolution about a radius of the light tube 11. Alternately, the droplets 67 can have other shapes, such as, for example, conical or ellipsoidal. In the preferred embodiment, the droplets 67 are formed in a plurality of axially extending rows; however, the droplets 67 can also be arranged in other patterns. For example, the droplets 67 in each axially extending row can be merged to form a continuous axially extending bead having a parabolic cross section.

Similar to the reflector and scattering layers 15 and 34 described above, it is contemplated that the droplets 67 are formed upon the inner surface of the optical film 13 before assembling the light tube 11. Thus, the droplets 67 can be formed upon a flat surface. Also, while the preferred embodiment shows one group of droplets 67 extending axially along the inner surface of the bottom of the light tube 11, it will be appreciated that the droplets 67 can be formed into multiple axially extending groups in other positions about the inner circumference of the light tube 11.

While both the light scattering layer 34 and the extractor droplets 67 have been described and illustrated as being included in the light tube 11 shown in FIGS. 5 and 6, it will be appreciated that a light tube can be formed which includes only one of the components. Thus, a light tube (not shown) can be formed having only a light scattering film 34 or only a plurality of droplets 117 for a light extractor.

The present invention also contemplates a method for assembling the light tube 11 and supporting structure 10 shown in FIGS. 2 and 5. The method includes providing the supporting structure 10 and precut sheets of optical lighting film 13 and clear plastic for the outer shell 14. One of the longitudinal edges of the outer shell 14 is inserted into one of the base member slots 22 and 23 and secured therein. One longitudinal edge of the optical lighting film 13 is spot welded to the bottom surface of the base member 20. As described above, the spot welds 26 are formed in a longitudinal line and are offset from the edge of the optical lighting film 13 to form the pocket 27 between the base member 20 and the film 13. Alternately, a strip of double adhesive tape can be placed between the optical film 13 and the base member 20 to secure the film 13 to the member 20. The sheet of optical lighting film 13 is laid over the plastic sheet 14 to form a light tube assembly (not shown). Because the sheets of film 13 and plastic 14 are flat, the light tube assembly can be fabricated prior to shipping to the work site and a large number of units can be economically packaged and shipped to the work site.

Upon arrival at the work site, the film 13 and outer shell 14 are rolled into a cylinder and the second longitudinal edge of the outer shell 14 is inserted into the other of the base member slots 22 and 23 and secured therein to form a light tube 11. As the light tube 11 is rolled, the free edge of the optical lighting film 13 is inserted into the pocket 27 formed between the secured edge of the film 13 and the base member 20. The base member rib 30 is inserted into the supporting member slot 38. The hangers 45 are attached to the ceiling 12 or other surface and the suspension member 21 mounted upon the hangers 45. It will be appreciated that the above method also applies to the alternate embodiment of the supporting structure 50 illustrated in FIG. 3.

The invention further contemplates a novel structure for supporting light tubes which pass through a wall or for mounting a light source on the end of light tube illuminating a room interior with the light source located outside of the illuminated room. The structure, which is shown generally at 70 in FIG. 7, includes outer and inner mounting rings, 71 and 72, respectively. In the preferred embodiment, the mounting rings 71 and 72 are formed from a plastic, such as a polycarbonate; however, other materials can be used to form the rings 71 and 72. Both rings 71 and 72 have flanges 73 and 74, respectively, which are used to attach the rings 71 and 72 to opposite sides of a wall 75. An arpeture 76 having a circular cross section is formed through the wall 75 between the mounting rings 71 and 72.

Figure 9:
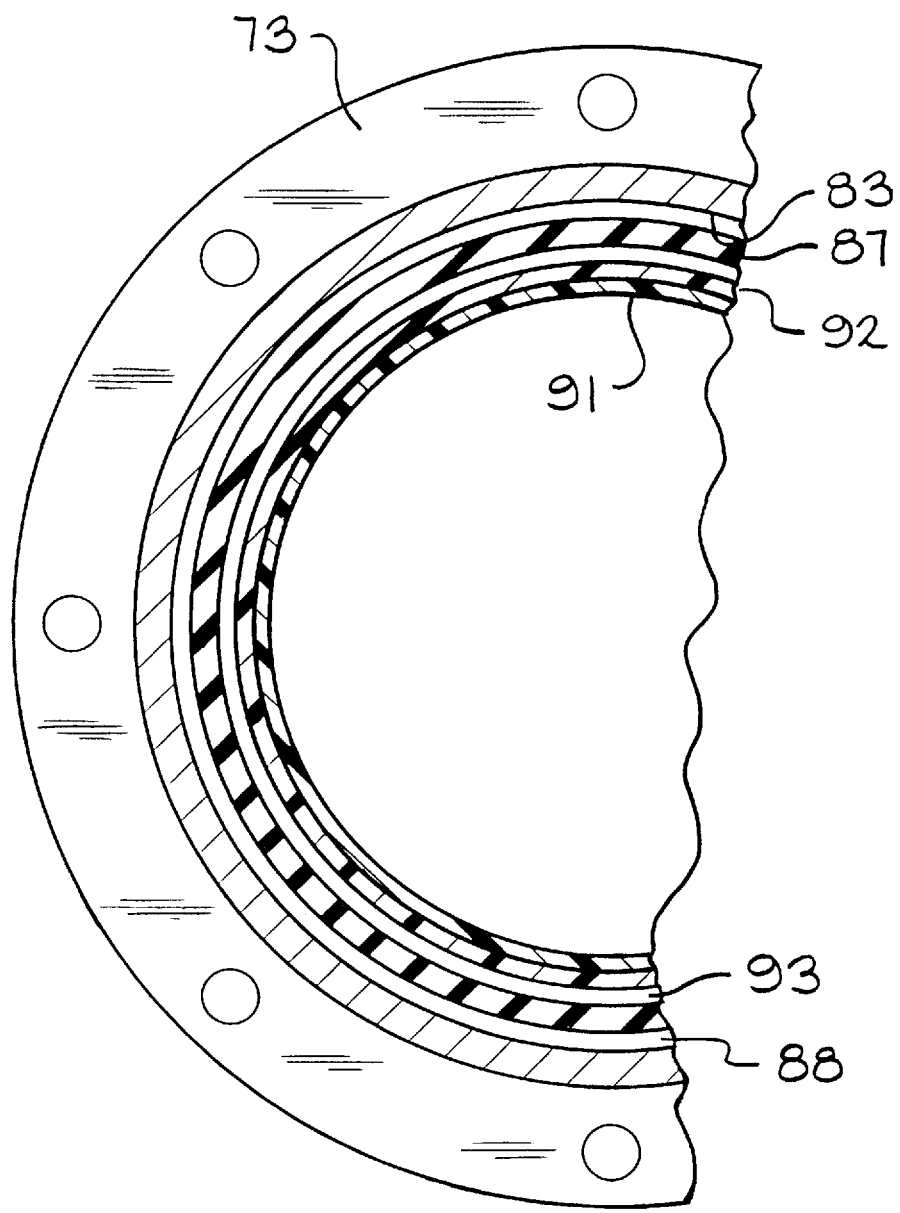
FIG. 9 is a fragmentary sectional view of the supporting structure shown in FIG. 7 taken along line 9—9.

The outer mounting ring 71, which is shown in greater detail in FIGS. 8 and 9, has a stepped bore 80 formed therethrough which defines a radially extending shoulder 81. The shoulder 81 divides the bore 80 into a first portion 82 adjacent to the wall 75 and a second portion 83. A circular groove 84 is formed in the surface of the shoulder 81. A resilient sealing ring 85, such as a neoprene O-ring, is disposed within the groove 84. A circular disc 86 of transparent material, such as tempered glass, is disposed in the second portion 83 of the bore 80 adjacent to the shoulder 81. The disc 86 is retained in the bore 80 by a retaining ring 87. The retaining ring urges the disc 86 against the sealing ring 85 to form a seal. The retaining ring 87 is secured in the bore 80 with a weld 88. Alternately, the retaining ring 87 can be threadingly attached to the mounting ring 71.

The retaining ring 87 slidingly receives the end of a first cylindrical light tube 90. The light tube 90 includes a cylinder of optical lighting film 91 enclosed within a tube 92 of clear plastic, such as a polycarbonate. As shown in FIG. 8, the end of the light tube 90 abuts the outer surface of the disc 86. the light tube 90 is retained in the mounting ring 71 by a continuous circumferential weld 93 formed between the end of the light tube 90 and the retaining ring 87. The weld 93 also hermetically seals the end of the light tube 90. Alternately, the end of a light source reflector (not shown) can be inserted into the retaining ring 87.

A second cylindrical light tube 94, which includes an optical light film 95 enclosed in a clear outer shell 96, passes through the inner mounting ring 72 and the wall aperture 76. The end of the second light tube 94 abuts the inner surface of the disc 86. The end of the second light tube 94 is secured to the outer mounting ring 71 by a first weld 97 and to the inner mounting ring 72 by a second weld 98. The first weld 97 hermetically seals the end of the second light tube 94. While two welds 97 and 98 are shown, only the first weld 97 may be sufficient to secure the second light tube 94.

The structure 70 permits lighting the interior of a room with a light source which is located exterior to the room. Additionally, the seal included in the structure 70 separates the light source from the illuminated room. This is advantageous under certain operating conditions. For example, the light tubes can be used to illuminate a dairy, which is subjected to frequent mandatory cleanings. The cleanings can include hosing down all the interior surfaces of the dairy with a liquid disinfectant. The removal of the light sources and the sealing of the light source from the interior of the dairy protects the light sources from damage during such cleanings.

While the preferred embodiment of the structure 70 has been described with cylindrical light tubes, it will be appreciated that the structure can be modified to accommodate light guides having other transverse sections.

Figure 10:
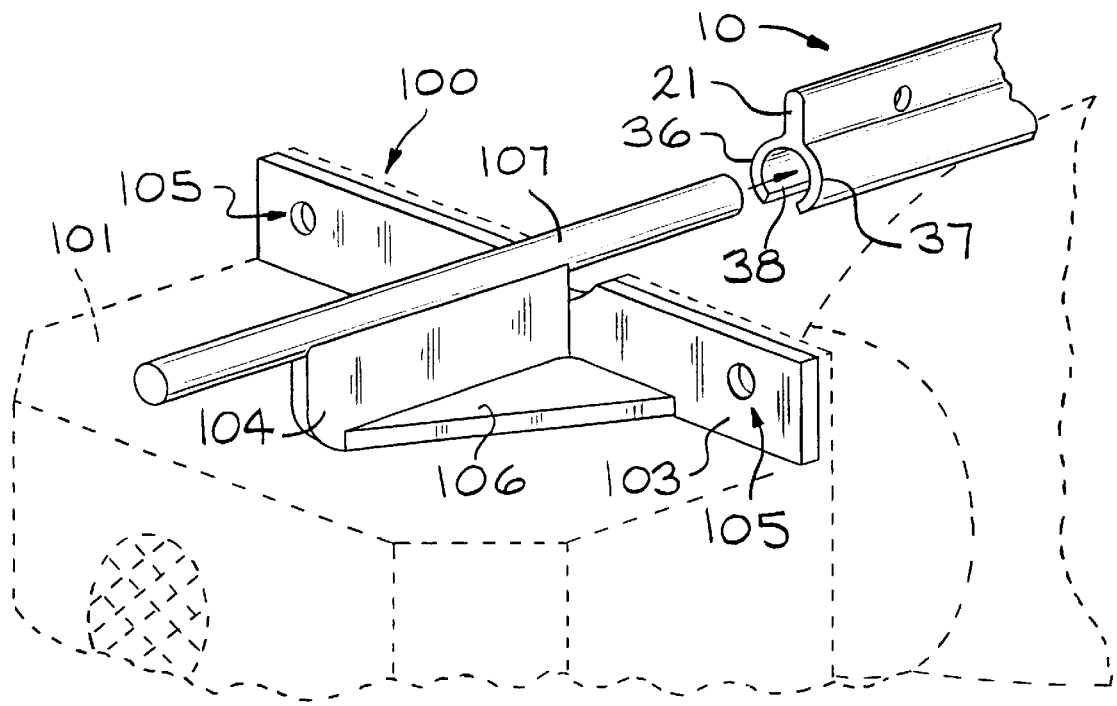
FIG. 10 is a perspective view of a light source mounting bracket in accordance with the invention.

As described above, the end of the light tube 11 attached to the source of illumination can be either fixed or free to move as the outer shell 14 expands and contracts during temperature variations. The present invention contemplates a mounting bracket, which is shown in generally at 100 in FIG. 10, for a light source 101 (shown in phantom). Components in FIG. 10 which are the same as components shown in previous figures are identified by the same numerical designators. The bracket 100 allows the light source 101 to move with the light tube shell 14.

The bracket 100 comprises a generally T-shaped member 102 having a mounting bar 103 attached to a support member 104. A plurality of apertures 105 (two shown) are formed through the mounting bar 103. The apertures 105 receive threaded fasteners (not shown) for attaching the light source 101 to the mounting bracket 100. A pair of triangular reinforcing gussets 106 are attached to the mounting bar 103 and support member 104. A horizontal cylindrical bar 107 is attached to the top of the support member 104. The bar 107 is sized to be slidingly received by the slot 38 formed in the supporting member 21. The arcuate shaped ribs 36 and 37 cooperate with the bar 107 to slidingly retain the mounting bracket 100 within the light guide supporting structure 10. Thus, as the light tube (not shown) attached to the light source 101 expands and contracts, the light source 101 is free to slide axially with the light tube along the light guide supporting structure 10. Accordingly, the light guide can be mounted as a free standing light source with both ends free to move.

In the preferred embodiment, the bracket 100 is fabricated from steel with the various components welded together; however, other materials can be used to form the bracket 100. For example, the mounting bracket 100 also can be formed form plastic members which are adhesively bound or ultrasonically welded together. It will be appreciated that, while the preferred embodiment of the bracket 100 shown in FIG. 10 includes the supporting member 21 shown in FIG. 2A, the invention can also be practiced with other supporting members, such as for example, the supporting member 51 shown in FIG. 3.

Figure 11:
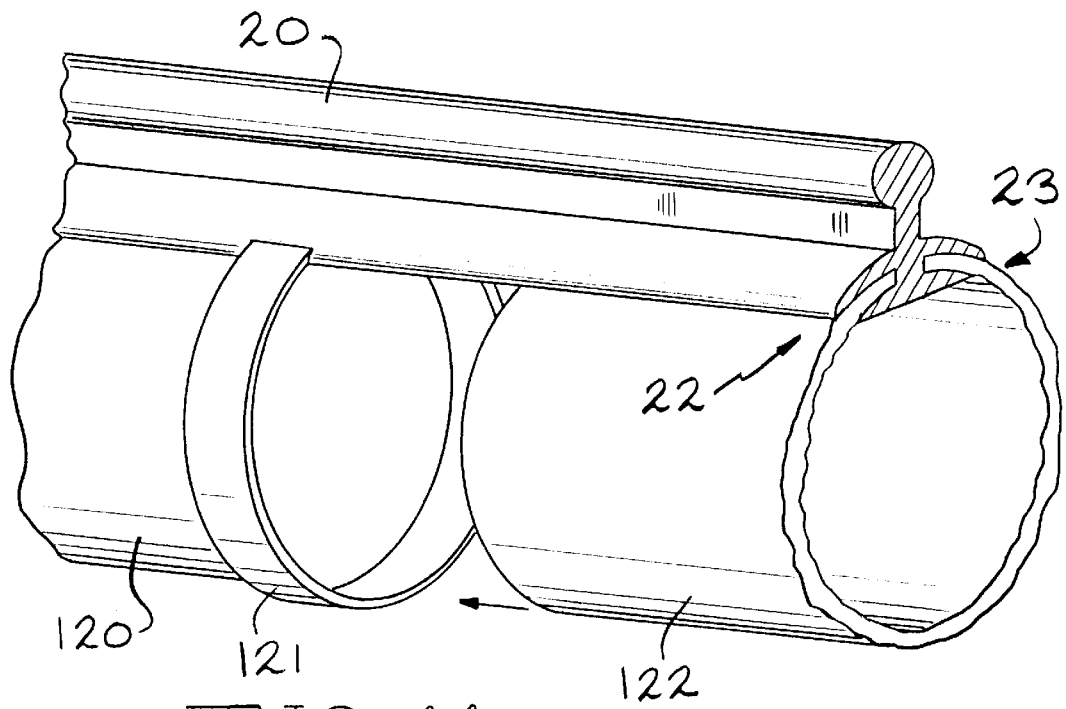
FIG. 11 is a perspective view of a light tube coupling in accordance with the invention.

The invention also contemplates a structure and method for assembling multiple light tubes into one continuous light tube. The structure and method is illustrated in FIG. 11 where a first light tube 120 is mounted upon a base member 20. A strip of polycarbonate is ultrasonically welded about the circumference of the end of the first light tube 120 to form a mounting ring 121. A portion of the ring 121 extends axially from the end of the first light tube 120. As shown in FIG. 11, the ends of the mounting ring 121 abut the edges of the base member 20. The weld extends in a continuous circumferential arc from one edge of the base member 20 to the opposite edge of the base member 20 to form a hermetic seal which protects the optical light film contained in the light tube 120 from air borne contaminates. A second light tube 122 is mounted upon the base member 20 by inserting the longitudinal edges of the outer shell into the base member slots 22 and 23. The second light tube 122 is slid axially along the base member 20 and into the mounting ring 121 with the end of the second light tube 122 abutting the end of the first light tube 120. Ultrasonic welds (not shown) are then formed to secure the second light tube 122 to the base member 20 and the mounting ring 121. Continuous welds are formed to hermetically seal the second light tube 122. Alternately, the polycarbonate strip 121 can be attached to the light tubes 120 and 122 with a commercially available adhesive, such as, for example, RTV Silicon. The inventor has found the use of polycarbonate mounting ring to be more durable that strips of adhesive tape for joining light tubes together.

Figure 12:
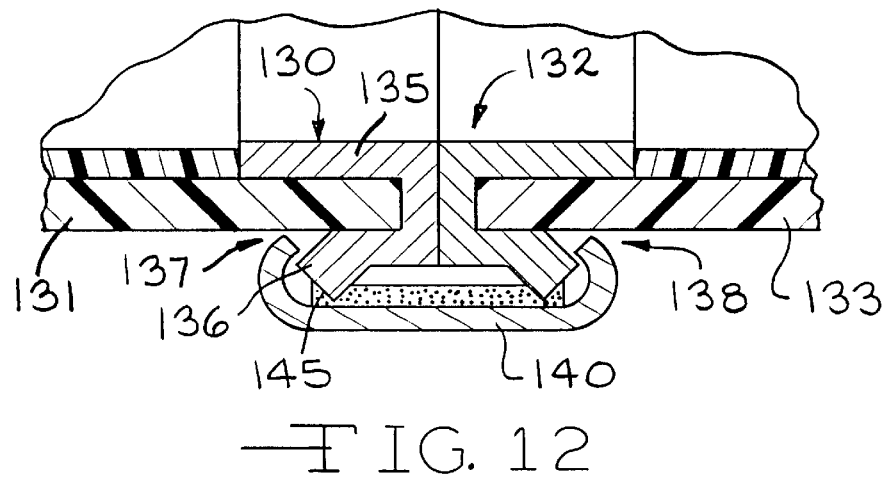
FIG. 12 is a partial sectional view of another light tube coupling in accordance with the invention.

The invention further contemplates another structure for assembling multiple light tubes into one continuous light tube. The structure is illustrated in FIG. 12 where a first J-shaped clip 130 is attached an end of a first light tube 131. Similarly, a second J-shaped clip 132 is attached to the end of a second light tube 133. In the preferred embodiment, the clips 130 and 132 are ultrasonically welded to light tubes 131 and 133; however other conventional means of attachment, such as, for example an adhesive, can be used. The clips 130 and 132 are formed from the same polycarbonate material as the light tube outer shells. The clips 130 and 132 are circular in shape and conform to the radius of the light tubes 131 and 133. The clips 130 and 132 extend circumferentially around the end of the associated light tube, 131 and 133, respectively. The first clip 130 includes an inner portion 135 and an outer portion 136. As shown in FIG. 12, the end of the outer portion 136 extends outward from the first light tube 131 and cooperates therewith to define a first circumferential pocket 137. Similarly the second clip 132 cooperates with the second light tube 133 to define a second circumferential pocket 138. Alternately, the end of each light tube can be flared to integrally form a J-shaped portion thereon (not shown).

A U-shaped joiner clip 140 has a first end 141 which is received by the first pocket 137 and a second end 142 which is received by the second pocket 138. In the preferred embodiment, the joiner clip 140 is circular and extends circumferentially around the ends of the light tubes 131 and 133. The joiner clip 140 is formed from a flexible plastic which allows insertion of the ends 141 and 142 into the pockets 137 and 138. The joiner clip 140 cooperates with the J-shaped clips 130 and 132 to secure the end of the first light tube 131 against the end of the second light tube 133. An annular gasket 145 is disposed within the joiner clip 140 and cooperates with the ends of the J-shaped clips 130 and 132 to form a hermetic seal for the light tube ends.

Alternately, a plurality of segmented joiner clips, each of which is formed as a segment of a circle (not shown), can be spaced equally about the circumference of the ends of the light tubes 131 and 133 and it may be possible to join the light tubes 131 and 133 with a single segmented joiner clip.

It will be appreciated that the clip 140 can be removed to allow separation of the light tubes 131 and 133 without damage. This allows reuse of the light tubes should the physical layout of the facility being illuminated be modified. Also, in FIG. 12 the optical film on the interior of the light tubes 131 and 133 is illustrated as extending to the J-clip; however, it will be appreciated that the invention can be practiced with the optical film extending to the end of the light tube. When the optical film extends to the end of the light tube, the optical film is received by the J-clip. Additionally, while the J-clips have been described above as being circular and extending circumferentially around the end of the associated light tube, it is contemplated that the J-clips can also be formed as a segment of a circle. The end of the light tube would be notched to receive the J-clip. The notch would assure that the ends of the light tubes would abut each other. Either a single J-clip could be attached to the end of each light tube, or a plurality of J-clips could be equally spaced about the circumference of each light tube end.

As described in the background, it is known to provide a focusing reflector at the end of a light tube which is opposite from the light source. The reflector functions to reflect any light reaching the far end of the light guide back into the guide. The inventor has determined that for light guides which are less than 24 feet (7.3 meters) long, a flat mirror can be used for the reflector at the far end of the light guide. For light guides longer than 24 feet (7.3 meters), a reflector having a plurality of either convex or concave dimples (not shown) formed upon the inner surface thereof can be used to reflect the light back into the light tube.

Figure 13:
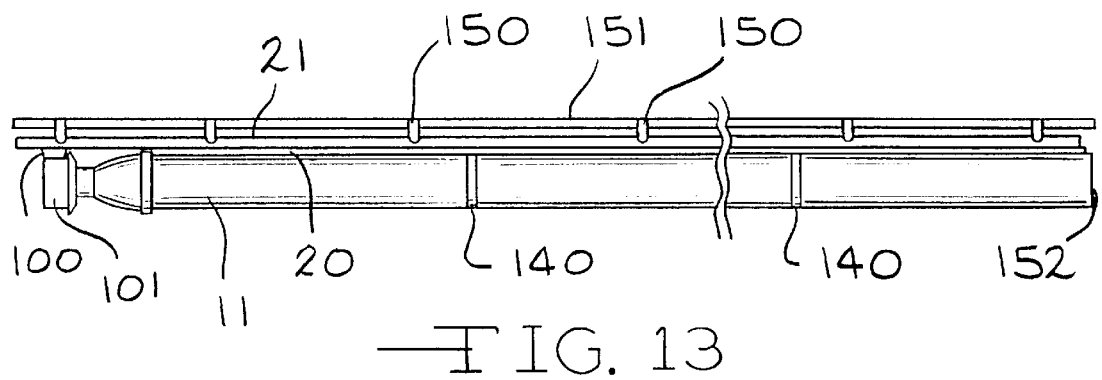
FIG. 13 is a side view of a light guide having a supporting structure in accordance with the invention.

A side view of a typical installation utilizing a light tube 11 and supporting structure 10 in accordance with the invention is illustrated in FIG. 13. As shown in FIG. 13, the supporting member 21 is hung by conventional Unistrut hangers 150 from a Unistrut U-Channel 151 which is attached to a horizontal surface. A reflector 152 as described above is disposed across the end of the light tube 11 opposite from the light source 101.

It has been the experience of the inventor that when the length of a light tube exceeds approximately 50 feet, a light source should be installed at each end of the light tube to assure a constant level of lighting. It would be desirable to provide power to both light sources from a common electrical control switch. This typically requires running power supply wires from the light source which is closest to the control switch to the light source at the opposite end of the light tube. Accordingly, the invention further contemplates including a conduit for the power supply wiring within the light tube supporting structure. An alternate embodiment of the light tube supporting structure which includes an integral electrical conduit is illustrated generally at 150 in FIG. 14.

Figure 14:
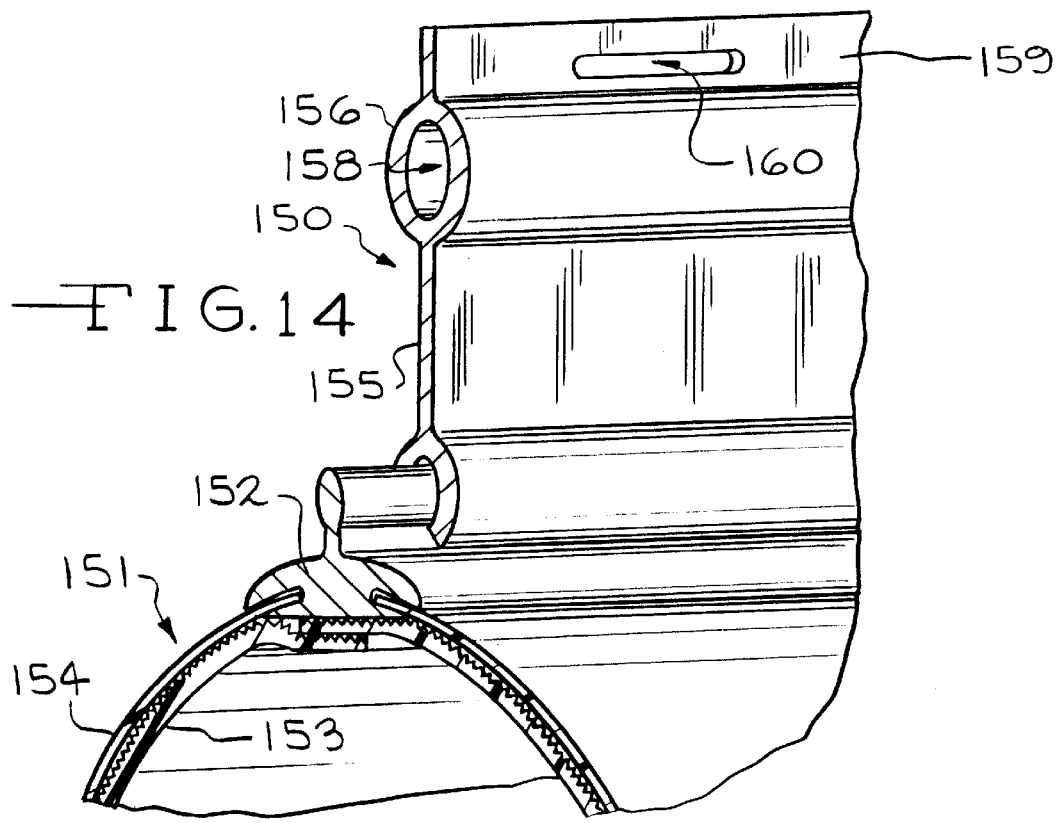
FIG. 14 is perspective sectional view of the light guide supporting structure shown in FIG. 1.

In FIG. 14, a light tube 151, which is similar to the light tube 11 shown in FIG. 1, is suspended from a slotted base member 152. The light tube 151 includes a layer of optical lighting film 153 contained within a cylindrical outer shell 154. For simplicity, the reflector film, scattering film and light extractor film described above are not shown in FIG. 14. As described above, the base member 152 is slidably attached to a vertical supporting member 155. The center portion of the supporting member 155 includes a hollow cylindrical tube 156 which extends axially along the entire length of the supporting member 155. In the preferred embodiment, the tube 156 is extruded integrally with the supporting member 155; however, the supporting member 155 can also be formed by other conventional methods, such as by fabrication from separately formed components. For example, upper and lower longitudinal members can be attached to the top and bottom, respectively, of a hollow tube. The tube 156 is open at both ends and defines an axial cavity 158 which can be used as an electrical conduit. A flange 159 extends in an upward direction from the top of the tube 156. A plurality of slots 160 (one shown) are formed through the flange 159 for receiving hangers (not shown) for suspending the supporting structure from a surface.

The axial cavity 158 receives electrical wires for powering a second light source (not shown) at the far end of the light tube 151. The cavity 158 also can accommodate communication lines, such as, for example, instrument signal and control wires or control air lines. Accordingly, it will be appreciated that the size and shape of the tube 156 can vary to accommodate the specific use. For example, the tube 156 can alternately have an oval or elliptical section. If building codes require separate conduit runs for multiple circuits, a plurality of parallel hollow tubes (not shown) can be formed in the supporting member 155.

Figure 15:
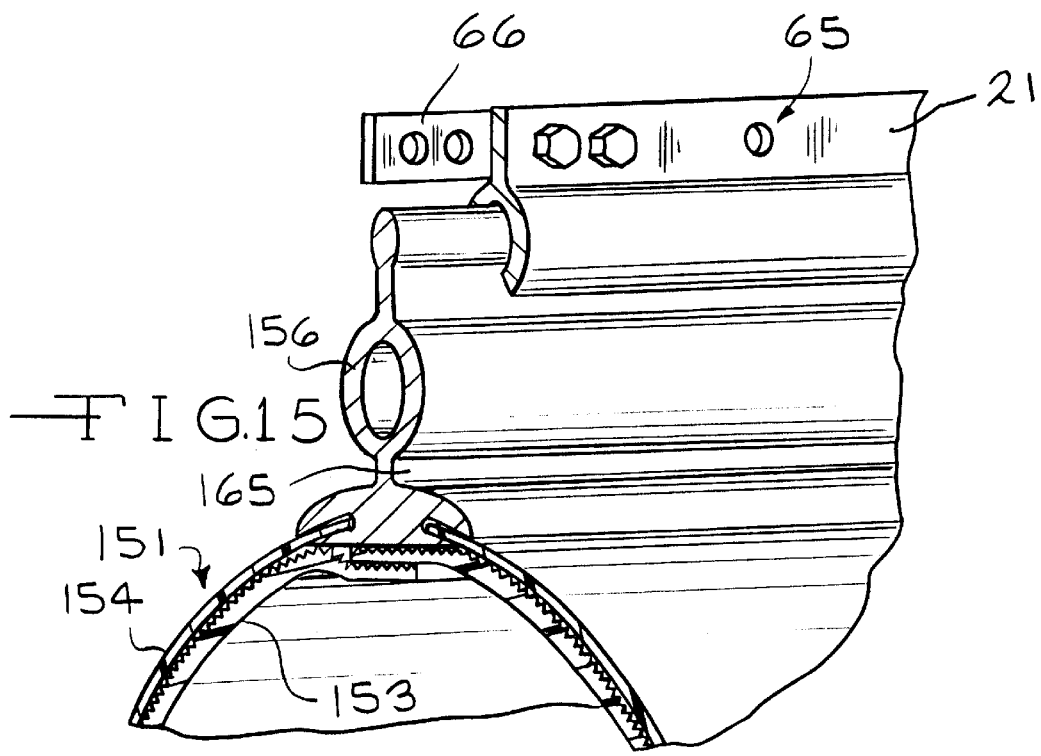
FIG. 15 is a perspective sectional view of an alternate embodiment of the light guide supporting structure shown in FIG. 14.

It will be appreciated that the conduit described above also can be included with the alternate embodiments of the supporting structures illustrated in FIGS. 2 through 13. Additionally, it also will be appreciated that the hollow tube 156 can be formed in a base member 165 as shown in FIG. 15. The components in FIG. 15 which are the similar to components shown in the other figures are identified by the same numerical designators. In the structure shown in FIG. 15, the supporting member 21 is similar to the structure illustrated in FIG. 5 and has a plurality of apertures 65 (one shown) formed therethrough. The apertures receive conventional mounting hardware. Additionally, a connector plate 66 is mounted on one end of the supporting member 21 for attaching the supporting member 21 to an adjacent supporting member (not shown).

Figure 16:
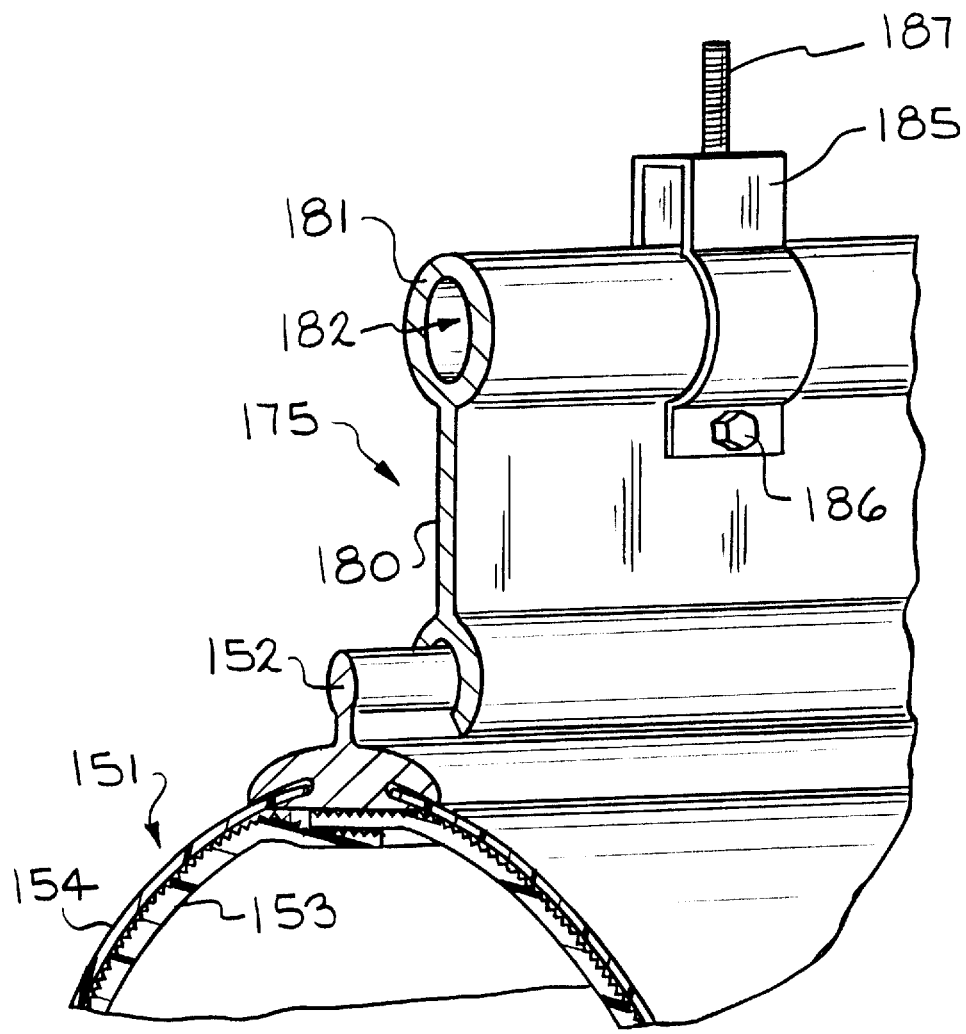
FIG. 16 is a perspective sectional view of an alternate embodiment of the light guide supporting structure shown in FIG. 14.

Another alternate embodiment of the light tube supporting structure is shown generally at 175 in FIG. 16. The components in FIG. 16 which are the similar to components shown in FIG. 14 are identified by the same numerical designators. As shown in FIG. 16, a light tube 151 is secured to a base member 152 which is slidably attached to a vertical supporting member 180. For simplicity, light extractors are not shown in FIG. 16. The top portion of the supporting member 180 is formed as a hollow cylindrical tube 181. The tube 181 defines an axial cavity 182 which can be used as a conduit.

The invention contemplates suspending the light tube 151 and supporting structure 175 from a plurality of pipe hangers 185 (one shown). The pipe hangers 185 clamp onto the exterior surface of the cylindrical tube 181 and are secured by first threaded fasteners 186 which extend through bolt holes (not shown) formed through the vertical supporting member 180. A second threaded fastener 187 extends in an upward direction from each of the pipe hangers 185 to attach the light tube assembly to a surface (not shown).

Figure 17:
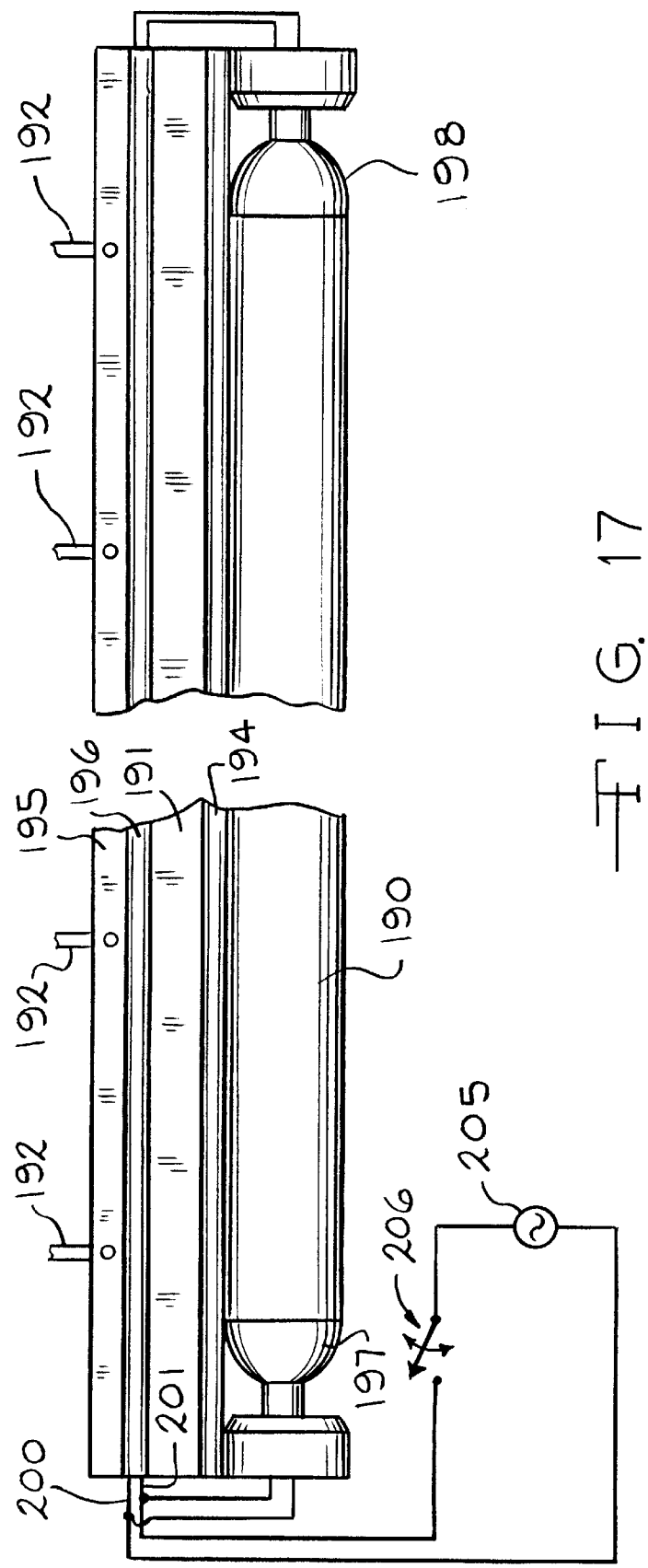
FIG. 17 is a side view of a light guide supporting structure in accordance with the invention.

As described above, the cavity formed in the supporting structure can be used as a conduit for electrical or communications lines. An example of such a use is illustrated in FIG. 17 where a light guide 190 is mounted upon a support structure 191. The support structure 191 is suspended by a plurality of conventional hangers 192 from a ceiling (not shown) as described above. The supporting structure 191 includes a base member 194 sidingly mounted upon a supporting member 195. An axial cavity 196 is formed in the supporting member 195. The axial cavity 196 extends form one end of the supporting member 195 to the other end thereof. A first light source 197 is mounted upon the left end of the light guide 190 and a second light source 198 is mounted upon the right end of the light guide 190. First and second power lines, 200 and 201, respectively, extend though the axial cavity 196 and are connected to the first and second light sources 197 and 198. The first power line 200 is connected to a power supply 205 while the second power line extends through a power switch 206 to the power supply. As shown in FIG. 17, the light sources 197 and 198 are connected in parallel so that if one light source should fail, the second will continue to function. Thus the supporting structure 191 not only supports the light guide 190 but also provides an electric conduit for supplying power to the light sources 197 and 198.

While the preferred embodiments of the supporting structure have been described above and illustrated in FIGS. 14 through 16, it will be appreciated that a specific structural feature shown in one embodiment can be used in another embodiment. For example, in the embodiment shown in FIG. 16, the axial cavity 182 shown in the supporting member 180 can be formed in the base member 152, similar to the structure illustrated in FIG. 15.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, it is contemplated that the structure illustrated in one of the embodiments can be used in the other embodiments. Thus, the printed reflector included in the light tube shown FIGS. 5 and 6 also can be included in the light tubes shown in FIGS. 1 through 4.

What is claimed is:

1. A structure for supporting a light guide comprising:

an elongated member having a base portion and a suspension portion, said base portion adapted to retain the longitudinal edges of a light guide, said suspension portion being adapted to be mounted upon a surface, said member including an enclosed axial passageway integrally formed therein.

2. A structure according to claim 1 wherein said passageway has a first open end and a second open end opposite from said first end and said passageway extends axially between said first and second open ends.

3. A structure according to claim 2 wherein said base portion is separate from said suspension portion, with said base portion being slidingly connected to said suspension portion, and further wherein said passageway is formed in said base portion.

4. A structure for supporting a light guide comprising:

an elongated base member having an axial rib formed thereon, said base member adapted to retain the longitudinal edges of a light guide, an elongated suspension member which is separate from said base member, said suspension member adapted to be mounted upon a surface and having an axial channel formed therein with said base member rib slidingly received in said channel; and an axial cavity formed in said base member, said cavity having a first end and a second end opposite from said first end, said cavity extending axially between said first and second ends.

5. A structure according to claim 4 wherein said cavity defines an electrical conduit.

6. A structure according to claim 5 wherein a light guide is mounted upon said base portion, said light guide having a first light source mounted upon one end and a second light source mounted upon a second end opposite from said first end, and further wherein at least one electrical line for supplying electric power extends axially through said electrical conduit formed in said base portion, said electrical line being connected to said first and second light sources.

7. A structure according to claim 4 wherein said cavity defines a conduit for communication lines.

8. A structure for supporting a light guide comprising:

an elongated base member adapted to retain the longitudinal edges of a light guide;

a suspension member, which is separate from said base member, said suspension member being slidingly connected to said base member; and a cavity formed in said suspension member, said cavity having a first end and a second end opposite from said first end, said cavity extending axially between said first and second ends.

9. A structure according to claim 8 wherein said cavity defines an electrical conduit.

10. A structure according to claim 9 wherein a light guide is mounted upon said base portion, said light guide having a first light source mounted upon one end and a second light source mounted upon a second end opposite from said first end, and further wherein at least one electrical line for supplying electric power extends axially through said electrical conduit formed in said suspension portion, said electrical line being connected to said first and second light sources.

11. A structure according to claim 8 wherein said cavity defines a conduit for communication lines.

\* \* \* \* \*